United States Patent
Ono et al.

(10) Patent No.: US 7,964,112 B2
(45) Date of Patent: Jun. 21, 2011

(54) PHOSPHOR AND PHOSPHOR PASTE

(75) Inventors: Keiji Ono, Itabashi-ku (JP); Susumu Miyazaki, Toride (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 1015 days.

(21) Appl. No.: 10/575,466

(22) PCT Filed: Oct. 21, 2003

(86) PCT No.: PCT/JP03/13403
§ 371 (c)(1),
(2), (4) Date: Sep. 15, 2006

(87) PCT Pub. No.: WO2005/037956
PCT Pub. Date: Apr. 28, 2005

(65) Prior Publication Data
US 2007/0018137 A1 Jan. 25, 2007

(51) Int. Cl.
*C09K 11/08* (2006.01)
*C09K 11/64* (2006.01)

(52) U.S. Cl. ..... 252/301.4 R; 252/301.4 F; 252/301.36; 252/301.6 F; 313/487

(58) Field of Classification Search ............ 252/301.4 F, 252/301.4 R, 301.36, 301.6 F; 313/487
See application file for complete search history.

(56) References Cited

U.S. PATENT DOCUMENTS

| 5,714,835 | A  | * | 2/1998 | Zachau et al. | 313/486 |
| 6,855,196 | B2 | * | 2/2005 | Kawamura et al. | 106/31.6 |
| 7,026,755 | B2 | * | 4/2006 | Setlur et al. | 313/501 |
| 7,239,085 | B2 | * | 7/2007 | Kawamura | 313/582 |
| 2002/0063301 | A1 | * | 5/2002 | Hanamoto et al. | 257/432 |
| 2003/0085853 | A1 | * | 5/2003 | Shiiki et al. | 345/60 |
| 2004/0041220 | A1 | * | 3/2004 | Kwak et al. | 257/432 |
| 2004/0056990 | A1 | * | 3/2004 | Setlur et al. | 349/69 |

FOREIGN PATENT DOCUMENTS

| EP | 1 090 975 A2 | 4/2001 |
| EP | 1 193 306 A2 | 4/2002 |
| EP | 1 321 500 A2 | 6/2003 |
| JP | 59-049279 A | 3/1984 |
| JP | 2001-236893 A | 8/2001 |
| JP | 2002-038147 A | 2/2002 |
| JP | 2002-80843 A | 3/2002 |
| JP | 2002-105446 A | 4/2002 |
| JP | 2003-313549 A | 10/2003 |
| JP | 2003-313549 A | 11/2003 |
| WO | WO 01/79362 | * 10/2001 |

OTHER PUBLICATIONS

Kunimoto et al., "C-9-1 Blue Emitting Eu Activated $CaMgSi_2O_6$ Phosphors for VUV Excitation," Proceedings of the 2000, the Institute of Electronics Information and Communication Engineers Society Conference, with English translation.

* cited by examiner

*Primary Examiner* — C. Melissa Koslow
(74) *Attorney, Agent, or Firm* — Sughrue Mion, PLLC

(57) ABSTRACT

A phosphor having a high brightness after being exposed to plasma and a phosphor paste containing the phosphor. The phosphor comprises a fluorescent substance $A^1$ containing a compound represented by the following formula (I) and at least one activator selected from the group consisting of Eu and Mn, and a fluorescent substance $B^1$ containing an aluminate;

$$mM^1O.nM^2O.2M^3O_2 \qquad (I)$$

[in the formula (I), $M^1$ is at least two selected from the group consisting of Ca, Sr and Ba, or Ca alone or Ba alone; $M^2$ is at least one selected from the group consisting of Mg and Zn; $M^3$ is at least one selected from the group consisting of Si and Ge; $0.5 \leq m \leq 3.5$; and $0.5 \leq n \leq 2.5$].

7 Claims, No Drawings

PHOSPHOR AND PHOSPHOR PASTE

TECHNICAL FIELD

The present invention relates to a phosphor and a phosphor paste.

BACKGROUND ART

Phosphors are used in fluorescent lamps, luminous indications, X-ray inspection systems, CRTs, vacuum ultraviolet excited light-emitting devices and so on. Known phosphors include aluminates [for example, $BaMgAl_{10}O_{17}:Eu$] and borates [for example, $(Y,Gd)BO_3:Eu$] as red phosphors, silicates [for example, $CaMgSi_2O_6:Eu$] as blue phosphors and silicates [for example, $Zn_2SiO_4:Mn$] as green phosphors, and they are used in plasma displays (hereinafter, referred to as PDPs) and vacuum ultraviolet excited light-emitting devices such as rare gas lamps.

The vacuum ultraviolet excited light-emitting devices are light-emitting devices in which plasma is generated by electric discharge in a rare gas, and a phosphor is excited by irradiating vacuum ultraviolet rays emitted from the plasma onto the phosphor, thereby resulting in emitting visible rays from the phosphor.

The brightness of the conventional phosphors decreases when the phosphor is exposed to the plasma.

DISCLOSURE OF THE INVENTION

An object of the present invention is to provide a phosphor having a high brightness even when it is exposed to plasma, and to provide a phosphor paste comprising the phosphor.

As the result of extensive researches for solving the above problems under these circumstances, the present inventors have found a phosphor with a high brightness by combining a specific silicate and aluminate and thus they has completed the present invention.

Therefore, the present invention provides a phosphor comprising a fluorescent substance $A^1$ containing a compound represented by the following formula (I) and at least one activator selected from the group consisting of Eu and Mn, and a fluorescent substance $B^1$ containing an aluminate;

$$mM^1O.nM^2O.2M^3O_2 \quad (I)$$

[in the formula (I), $M^1$ is at least two selected from the group consisting of Ca, Sr and Ba, or Ca alone or Ba alone;

$M^2$ is at least one selected from the group consisting of Mg and Zn;

$M^3$ is at least one selected from the group consisting of Si and Ge;

$0.5 \leq m \leq 3.5$; and $0.5 \leq n \leq 2.5$].

Further, the present invention provides a phosphor paste comprising the phosphor, a solvent and a binder.

The phosphor of the present invention has a high brightness after being exposed to plasma, and is suitable for vacuum ultraviolet excited light-emitting devices such as PDP and rare gas lamp. The phosphor and the phosphor paste provide a vacuum ultraviolet excited light-emitting device with a high brightness and a long life.

Mode for carrying out the invention

The phosphor of the present invention includes a fluorescent substance $A^1$. The fluorescent substance $A^1$ contains a compound represented by the above formula (I) and at least one selected from the group consisting of Eu and Mn as an activator.

In the formula (I), $M^1$ is at least two selected from the group consisting of Ca, Sr and Ba, or Ca alone or Ba alone;

$M^2$ is at least one selected from the group consisting of Mg and Zn;

$M^3$ is at least one selected from the group consisting of Si and Ge;

$0.5 \leq m \leq 3.5$; and $0.5 \leq n \leq 2.5$.

It is preferable that the fluorescent substance $A^1$ is a compound represented by the following formula (II):

$$(M^1_{1-a}Eu_a)(M^2_{1-b}Mn_b)M^3_2O_6 \quad (II)$$

[in the formula (II), $M^1$ is at least two selected from the group consisting of Ca, Sr and Ba, or Ca alone or Ba alone;

$M^2$ is at least one selected from the group consisting of Mg and Zn;

$M^3$ is at least one selected from the group consisting of Si and Ge;

$0 \leq a \leq 0.5$;

$0 \leq b \leq 0.5$; and $0 < a+b$].

It is more preferable that the fluorescent substance $A^1$ is a compound represented by the following formula (III):

$$Ca_{1-c-d}Sr_cEu_dMgSi_2O_6 \quad (III)$$

[in the formula (III), $0 \leq c \leq 0.1$; and $0 < d \leq 0.1$].

The phosphor of the present invention includes a fluorescent substance $B^1$ other than the fluorescent substance $A^1$. The fluorescent substance $B^1$ is an aluminate and preferably a compound represented by the following formula (IV):

$$p(M^4_{1-e}Eu_e)O.q(M^5_{1-f}Mn_f)O.rAl_2O_3 \quad (IV)$$

[in the formula (IV), $M^4$ is at least one selected from the group consisting of Ca, Sr and Ba;

$M^5$ is at least one selected from the group consisting of Mg and Zn;

$0.5 \leq p \leq 1.5$;

$0.5 \leq q \leq 1.5$;

$4.5 \leq r \leq 5.5$;

$0 < e \leq 0.5$; and $0 < f \leq 0.1$].

It is preferable that the fluorescent substance $B^1$ is a compound represented by the following formula (V):

$$Ba_{1-g}Eu_gMgAl_{10}O_{17} \quad (V)$$

[in the formula (V), $0 < g \leq 0.3$].

The weight ratio of fluorescent substance $A^1$/fluorescent substance $B^1$ is preferably from 5/95 to 95/5, more preferably from 20/80 to 90/10, and further preferably from 30/70 to 85/15. When the weight ratio of fluorescent substance $A^1$/fluorescent substance $B^1$ is within the above range, the obtained phosphor has a higher brightness when it is exposed to plasma.

When the both of the fluorescent substance $A^1$ and the fluorescent substance $B^1$ are in form of particles, the fluorescent substance $A^1$ has a primary particle diameter of usually 0.1 μm to 5 μm, preferably 0.3 μm to 3 μm. The fluorescent substance $B^1$ has a primary particle diameter of usually 0.1

μm to 5 μm, preferably 0.3 μm to 3 μm. It is preferable that $D_B^1$, the average primary particle diameter of the fluorescent substance $B^1$, is 0.2-5 times $D_A^1$, the primary particle diameter of the fluorescent substance $A^1$, namely, $D_A^1/D_B^1 \leqq 5$ and $D_B^1/D_A^1 \leqq 5$ are satisfied.

The phosphor of the present invention may include other phosphor insofar as it includes the fluorescent substance $A^1$ and the fluorescent substance $B^1$.

The phosphor of the present invention is excited by vacuum ultraviolet rays and has a high brightness, even when it is exposed to plasma. In the production of PDP and rare gas lamp, a phosphor layer is formed usually by a production method including steps of mixing a phosphor, a binder and a solvent to obtain a phosphor paste, coating the phosphor paste on a light-emitting unit, and heat-treating the light-emitting unit (for example, at 500° C.). The phosphor of the present invention has a brightness comparable to that before the heat treatment even after being subjected to the heat treatment as described above. Accordingly, when the phosphor of the present invention is used in vacuum ultraviolet excited light-emitting devices such as PDP and a rare gas lamp, PDP and a rare gas lamp with a high brightness and long life can be obtained.

In addition, the phosphor of the present invention is also excited by ultraviolet rays, X-rays, electron beams other than vacuum ultraviolet rays. The phosphor may be used in fluorescent lamps, luminous indications, X-ray inspection systems, CRTs and so on.

The phosphor with a high brightness according to the present invention may be produced, for example, by a method of mixing the fluorescent substance $A^1$ with the fluorescent substance $B^1$. The mixing may be carried out using an apparatus such as stirrer, ball mill and triple roller mill. In the mixing, a phosphor other than the fluorescent substance $A^1$ and the fluorescent substance $B^1$ may be added, if necessary.

The fluorescent substance $A^1$ may be prepared, for example, by calcining a mixture of metal compounds which is converted to the fluorescent substance $A^1$ by calcination.

Examples of calcium source, strontium source, barium source (corresponding to $M^1$ in the formula (I)) in the mixture include a compound which is decomposed to be an oxide at high temperature such as hydroxide, carbonate, nitrate, halide and oxalate having a purity of not less than 99%, or an oxide having a purity of not less than 99.9%.

Examples of magnesium source, zinc source (corresponding to $M^2$ in the formula (I)) in the mixture include a compound which is decomposed to be an oxide at high temperature such as hydroxide, carbonate, nitrate, halide and oxalate having a purity of not less than 99%, or an oxide having a purity of not less than 99%.

Examples of silicon source, germanium source (corresponding to $M^3$ in the formula (I)) in the mixture include a compound which is decomposed to be an oxide at high temperature such as hydroxide, carbonate, nitrate, halide and oxalate having a purity of not less than 99%, or an oxide having a purity of not less than 99%.

Examples of europium source, manganese source (an activator for the fluorescent substance $A^1$) in the mixture include a compound which is decomposed to be an oxide at high temperature such as hydroxide, carbonate, nitrate, halide and oxalate having a purity of not less than 99%, or an oxide having a purity of not less than 99%.

The fluorescent substance $A^1$ is prepared by mixing the above compounds weighed such that predetermined composition of fluorescent substance $A^1$ is obtained and calcining the mixture.

The mixing may be carried out, for example, using a ball mill, V-type mixer or stirrer. In the mixing, an appropriate amount of a flux may be added. By addition of a flux, the formation of the phosphor is promoted and calcination at a lower temperature becomes possible.

The calcination is preferably carried out under a reductive atmosphere, for example, under nitrogen atmosphere containing about 0.1% by volume to about 10% by volume of hydrogen, or argon atmosphere containing about 0.1% by volume to about 10% by volume of hydrogen. Usually, the calcination may be carried out under conditions of temperature of from about 1,000° C. to about 1,500° C. and time of from about 1 hour to about 100 hours.

When the mixture contains a compound which is decomposed to be an oxide at high temperature such as hydroxide, carbonate, nitrate, halide and oxalate, the mixture may be pre-calcined before the calcination.

The pre-calcination may be carried out under any of oxidative atmosphere (for example, under air) and reductive atmosphere. The pre-calcination may usually be conducted at temperature of from about 600° C. to about 900° C.

The fluorescent substance $A^1$ may be pulverized, washed or classified, if necessary. The pulverization may be carried out, for example, using a ball mill or jet mill. The pulverized fluorescent substance $A^1$ may be heat-treated. Crystallinity of the fluorescent substance $A^1$ (which is lowered by pulverization) may be enhanced by the heat treatment. The heat treatment may usually be carried out under the same conditions as those for the calcination described above.

Further, the fluorescent substance $A^1$ used in the present invention may be prepared, for example, by a method described in JP-A-2002-332481 or JP-A-2003-183644.

The fluorescent substance $B^1$ may be prepared, for example, by calcining a mixture of metal compounds which is converted to the fluorescent substance $B^1$ by calcination.

When the fluorescent substance $B^1$ contains, for example, barium (Ba), europium (Eu), magnesium (Mg), aluminum (Al) and oxygen (O):

Examples of barium source, europium source, magnesium source, and aluminum source in the mixture include a compound which is decomposed to be an oxide at high temperature and an oxide having a purity of not less than 99.9%.

The fluorescent substance $B^1$ is prepared by mixing the above compounds weighed such that predetermined composition of fluorescent substance $B^1$ is obtained and calcining the mixture.

The mixing, calcination and optional pre-calcination may be carried out under the same conditions as those for the fluorescent substance $A^1$. The fluorescent substance $B^1$ obtained by calcination may be pulverized, washed or classified, if necessary. The pulverization may be carried out, for example, using a ball mill or jet mill. The pulverized fluorescent substance $B^1$, may be heat-treated. Crystallinity of the fluorescent substance $B^1$ (which is lowered by pulverization) can be enhanced by the heat treatment. The heat treatment may usually be carried out under the same conditions as those for the calcination described above.

Further, the fluorescent substance $B^1$ used in the present invention may be prepared, for example, by a method described in JP-A-2001-220582.

The phosphor paste according to the present invention is described.

The phosphor paste of the present invention includes the above phosphor, a binder and a solvent. A film or a layer can easily be formed on a substrate by coating the phosphor paste on the substrate and heating. The heating is usually carried out at a temperature not lower than a temperature at which the solvent evaporates and lower than a temperature at which the binder decomposes.

The phosphor paste of the present invention may be produced, for example, by a method of mixing the fluorescent substance $A^1$, the fluorescent substance $B^1$, a solvent and a binder using an apparatus such as a ball mill, triple roller mill, beads mill and roller mill.

Examples of the binder in the phosphor paste include cellulose resins (ethylcellulose, methylcellulose, nitrocellulose, acetylcellulose, cellulose propionate, hydroxypropylcellulose, butylcellulose, benzylcellulose, modified cellulose and the like), acryl resins (polymers of at least one among monomers including acrylic acid, methacrylic acid, methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, tert-butyl acrylate, tert-butyl methacrylate, 2-hydroxyethyl acrylate, 2-hydroxyethyl methacrylate, 2-hydroxypropyl acrylate, 2-hydroxypropyl methacrylate, benzyl acrylate, benzylmethacrylate, phenoxyacrylate, phenoxymethacrylate, isobornyl acrylate, isobornyl methacrylate, glycidyl methacrylate, styrene, α-methylstyrene, acrylamide, methacrylamide, acrylonitrile, methacrylonitrile and the like), ethylene-vinyl acetate copolymer resins, polyvinyl butyral, polyvinyl alcohol, propylene glycol, urethane resins, melamine resins and phenol resins.

The amount of the binder is usually 5% by weight to 50% by weight based on the total weight of the fluorescent substance $A^1$ and the fluorescent substance $B^1$.

Examples of the solvent in the phosphor paste include monohydric alcohols having a higher boiling point; polyhydric alcohols such as diols and triols typically exemplified by ethylene glycol and glycerin; compounds formable by etherifying or esterifying an alcohol (ethylene glycol monoalkyl ether, ethylene glycol dialkyl ether, ethylene glycol alkyl ether acetate, diethylene glycol monoalkyl ether acetate, diethylene glycol dialkyl ether, propylene glycol monoalkyl ether, propylene glycol dialkyl ether and propylene glycol alkyl acetate).

The amount of the solvent is usually 100% by weight to 600% by weight based on the total weight of the fluorescent substance $A^1$ and the fluorescent substance $B^1$.

EXAMPLES

The present invention will be explained in more detail by following examples, which should not be constructed as limiting the invention in any manner.
The brightness of the specimen (phosphor) is measured by the following method:

A specimen is heat-treated in the air at 500° C. for 30 minutes and, is exposed to a plasma of 50 W for 15 minutes under an atmosphere of a gas composition: 5% by volume of xenon (Xe) and 95% by volume of neon (Ne) and a pressure: 13.2 Pa.

The obtained specimen was irradiated by vacuum ultraviolet rays using Excimer 146 nm lamp (model H0012, made by Ushio Denki) in a vacuum chamber under pressure of 6.7 Pa ($5\times10^{-2}$ Torr) or lower.
Reference 1

The brightness of an aluminate ($Ba_{0.9}Eu_{0.1}MgAl_{10}O_{17}$, a blue fluorescent substance, average primary particle diameter: 0.4 μm) was measured according to the above method. The brightness of the aluminate was assumed be 100.

Reference 2

The brightness of a silicate ($Ca_{0.9215}Sr_{0.0485}Eu_{0.03}MgSi_2O_6$, a blue fluorescent substance, average primary particle diameter: 1.0 μm) was measured according to the above method. The silicate had a brightness of 104.

Example 1

50 parts by weight of the fluorescent substance in Reference 2 were wet-mixed with 50 parts by weight of the fluorescent substance in Reference 1 in ethanol to obtain a mixture. The mixture was dried to obtain a phosphor. The brightness of the phosphor was measured. The phosphor emitted blue light and had a brightness of 127.

Example 2

80 parts by weight of the fluorescent substance in Reference 2 were wet-mixed with 20 parts by weight of the fluorescent substance in Reference 1 in ethanol to obtain a mixture. The mixture was dried to obtain a phosphor. The brightness of the phosphor was measured. The phosphor emitted blue light and had a brightness of 113.

Example 3

20 parts by weight of the fluorescent substance in Reference 2 were wet-mixed with 80 parts by weight of the fluorescent substance in Reference 1 in ethanol to obtain a mixture. The mixture was dried to obtain a phosphor. The brightness of the phosphor was measured. The phosphor emitted blue light and had a brightness of 107.

The invention claimed is:

1. A phosphor comprising a fluorescent substance $A^1$ containing a compound represented by the following formula (II) and at least one activator selected from the group consisting of Eu and Mn, and a fluorescent substance $B^1$ containing an aluminate:

$$(M^1_{1-a}Eu_a)(M^2_{1-b}Mn_b)M^3_2O_6 \quad (II)$$

wherein
$M^1$ is at least two selected from the group consisting of Ca, Sr and Ba, or Ca alone or Ba alone;
$M^2$ is at least one selected from the group consisting of Mg and Zn;
$M^3$ is at least one selected from the group consisting of Si and Ge;
$0 \leq a \leq 0.5$;
$0 \leq b \leq 0.5$; and
$0 < a+b$; and
wherein the weight ratio of fluorescent substance $A^1$/fluorescent substance $B^1$ is from 5/95 to 95/5.

2. The phosphor according to claim 1, wherein the fluorescent substance $A^1$ is a compound represented by the following formula (III):

$$Ca_{1-c-d}Sr_cEu_dMgSi_2O_6 \quad (III)$$

wherein
$0 \leq c \leq 0.1$; and
$0 < d \leq 0.1$.

3. The phosphor according to claim 1, wherein the aluminate is a compound represented by the following formula (IV):

$$p(M^4_{1-e}Eu_e)O \cdot q(M^5_{1-f}Mn_f)O \cdot rAl_2O_3 \quad (IV)$$

wherein
- $M^4$ is at least one selected from the group consisting of Ca, Sr and Ba;
- $M^5$ is at least one selected from the group consisting of Mg and Zn;
- $0.5 \leq p \leq 1.5$;
- $0.5 \leq q \leq 1.5$;
- $4.5 \leq r \leq 5.5$;
- $0 < e \leq 0.5$; and
- $0 < f \leq 0.1$.

4. The phosphor according to claim 1, wherein the aluminate is a compound represented by the following formula (V):

$$Ba_{1-g}Eu_gMgAl_{10}O_{17} \qquad (V)$$

wherein,
$0 < g \leq 0.3$.

5. The phosphor according to claim 1, wherein the fluorescent substance $B^1$ is in form of particles and $D_B^1$ that is the average primary particle diameter of the fluorescent substance $B^1$ is 0.2-5 times $D_A^1$ that is the primary particle diameter of the fluorescent substance $A^1$.

6. A phosphor paste comprising the phosphor according to claim 1, a solvent and a binder.

7. A vacuum ultraviolet excited light-emitting device comprising the phosphor according to claim 1.

* * * * *